US 6,749,135 B2

(12) United States Patent
Groblebe et al.

(10) Patent No.: US 6,749,135 B2
(45) Date of Patent: Jun. 15, 2004

(54) MANUAL DISHWASHING SPRAY HEAD WITH WATER AND SOAP CONTROLS

(76) Inventors: David G. Groblebe, P.O. Box 2265, Durango, CO (US) 81302; Jeffrey S. Orach, 7925 N. Oracle Rd., #204, Tucson, AZ (US) 85704

( * ) Notice: Subject to any disclaimer, the term of this patent is extended or adjusted under 35 U.S.C. 154(b) by 0 days.

(21) Appl. No.: 10/173,353

(22) Filed: Jun. 14, 2002

(65) Prior Publication Data

US 2003/0230645 A1 Dec. 18, 2003

(51) Int. Cl.[7] ................................................. B05B 9/01
(52) U.S. Cl. ..................... 239/526; 239/314; 239/315; 239/413; 239/418
(58) Field of Search ................................ 239/282, 283, 239/310, 315, 407, 413, 419, 423, 526, 583, 586, 588, 587.4, 587.1, 74, 333, 312, 314, 418

(56) References Cited

U.S. PATENT DOCUMENTS

| 3,581,998 A | * | 6/1971 | Roche ......................... 239/415 |
| 5,109,553 A | * | 5/1992 | Kishimoto ..................... 4/518 |
| 5,716,005 A | * | 2/1998 | McMahan ................... 239/315 |
| 5,829,681 A | * | 11/1998 | Hamel et al. ............... 239/304 |
| 5,906,319 A | * | 5/1999 | Crowl .......................... 239/310 |
| 5,988,911 A | * | 11/1999 | Browne et al. ................. 401/42 |
| 6,000,626 A | * | 12/1999 | Futo et al. ..................... 239/74 |
| 6,164,557 A | * | 12/2000 | Larson ......................... 239/75 |
| 6,170,107 B1 | * | 1/2001 | George et al. .................. 15/24 |
| 6,257,786 B1 | * | 7/2001 | Thomas ........................ 401/43 |
| 6,595,440 B2 | * | 7/2003 | Moriarty et al. ............ 239/226 |

* cited by examiner

*Primary Examiner*—Henry Bennett
*Assistant Examiner*—Amanda Flynn
(74) *Attorney, Agent, or Firm*—Maxwell C. Freudenberg; Kenton L. Freudenberg

(57) ABSTRACT

A pistol-grip kitchen spray device with elongated nozzle and handle portions. Using one hand, separate front upper and lower triggers actuate within the handle a rinse liquid valve and a soap pump to selectively dispense from the nozzle rinse liquid from a retractable hose and/or a soap liquid from a reservoir within the handle. A swivel connection is provided between the supply hose and the handle. A hose-retracting base with manual temperature control may supply rinse liquid at a selectable temperature solely to the hose of the spray device. The base includes a momentary valve with spigot for filling a drinking glass. The nozzle supports various non-rotatable latched scouring brush and abrasive accessories or a pet brush. One elongated brush on the elongated nozzle enables cleaning the entire length of a tall container. Alternative spray device mounting may be at bathroom shower head.

10 Claims, 8 Drawing Sheets

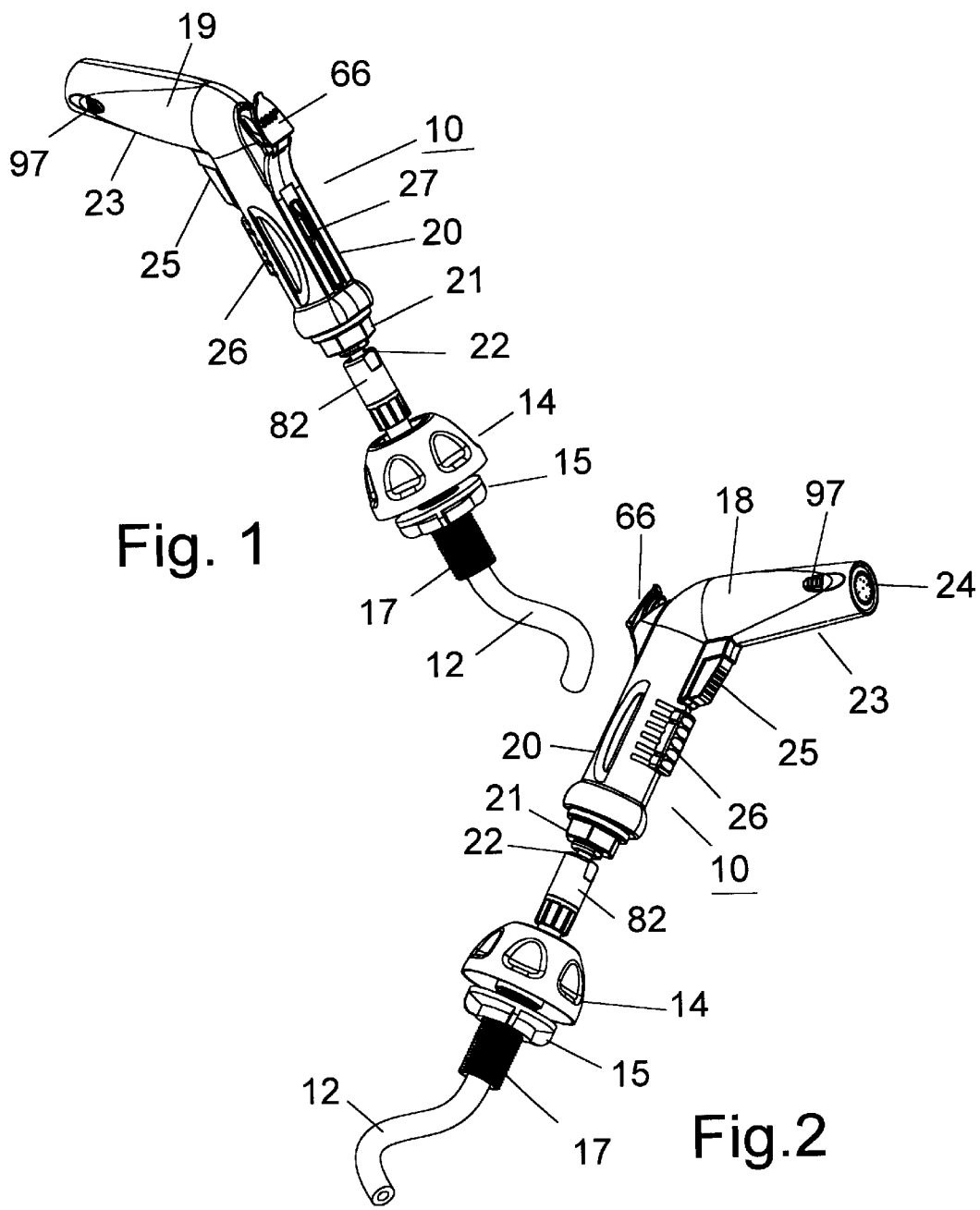

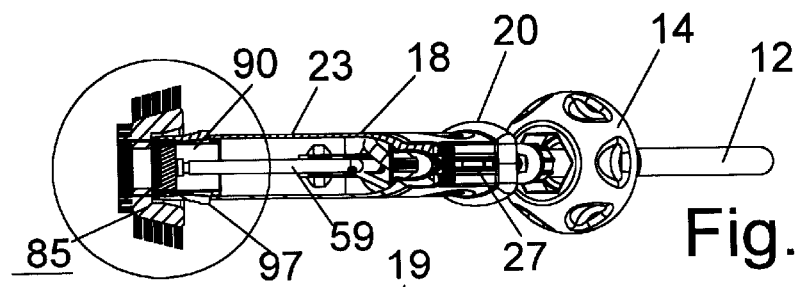
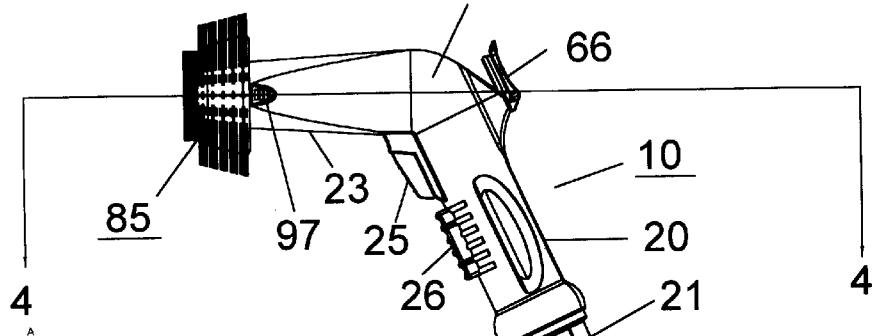
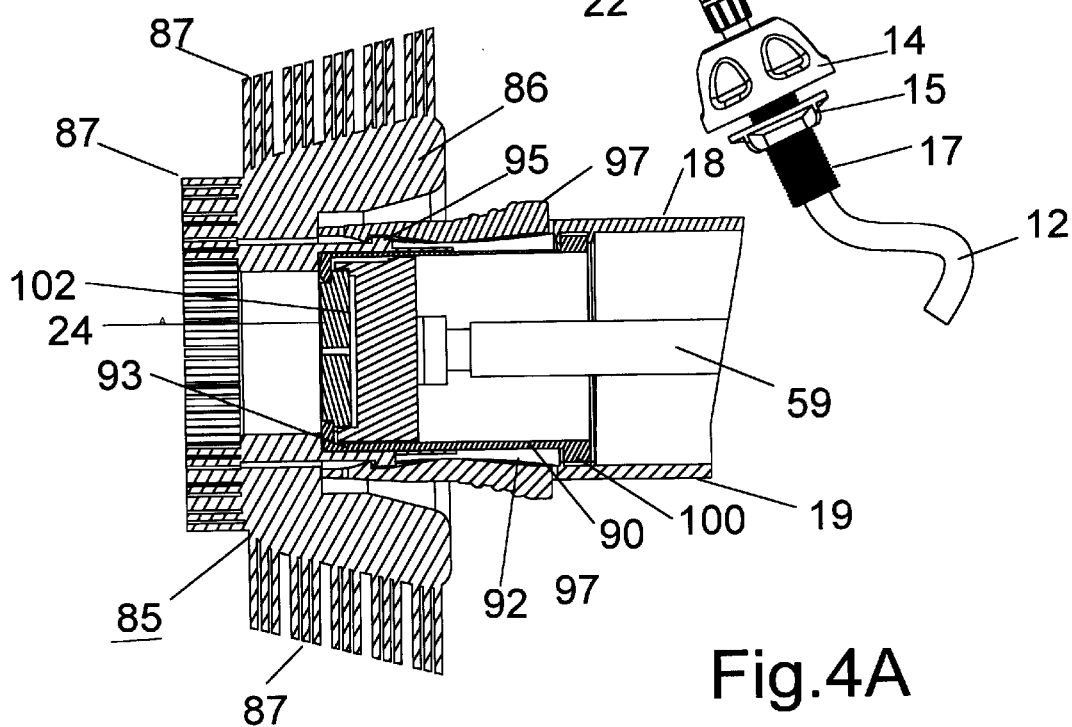

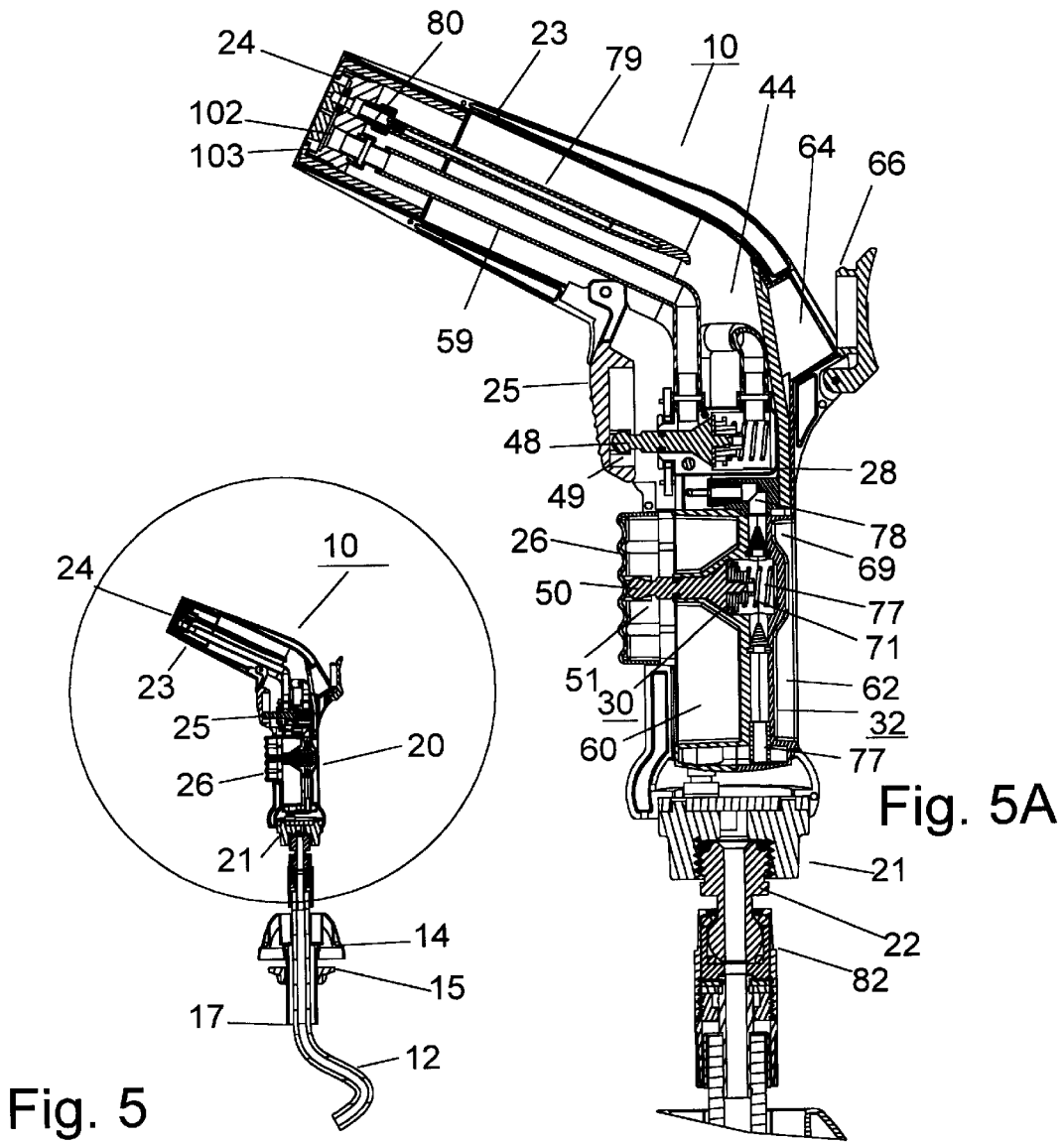

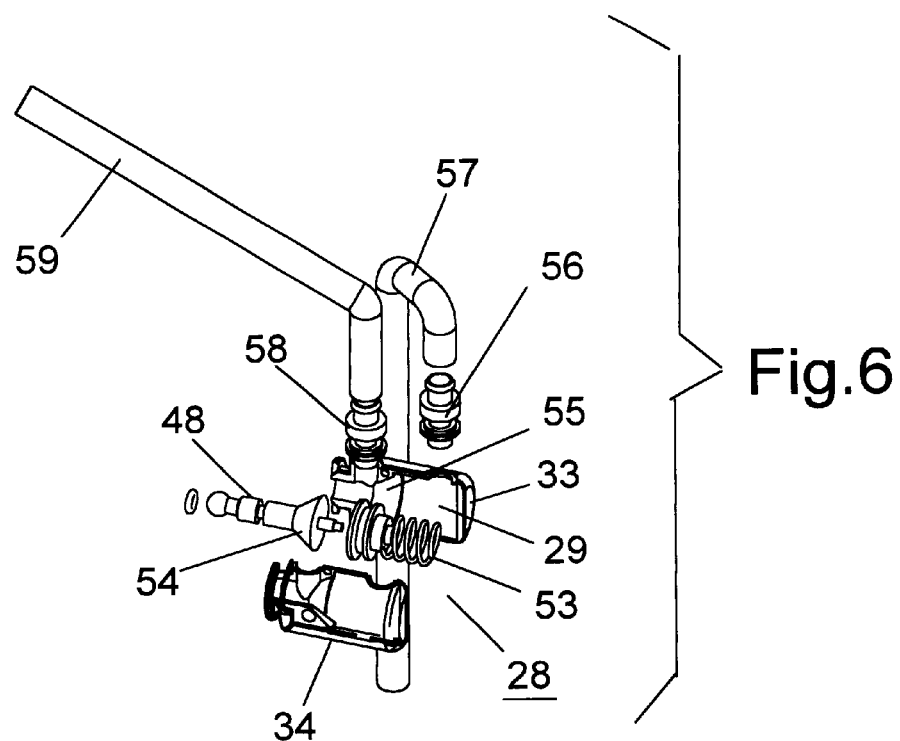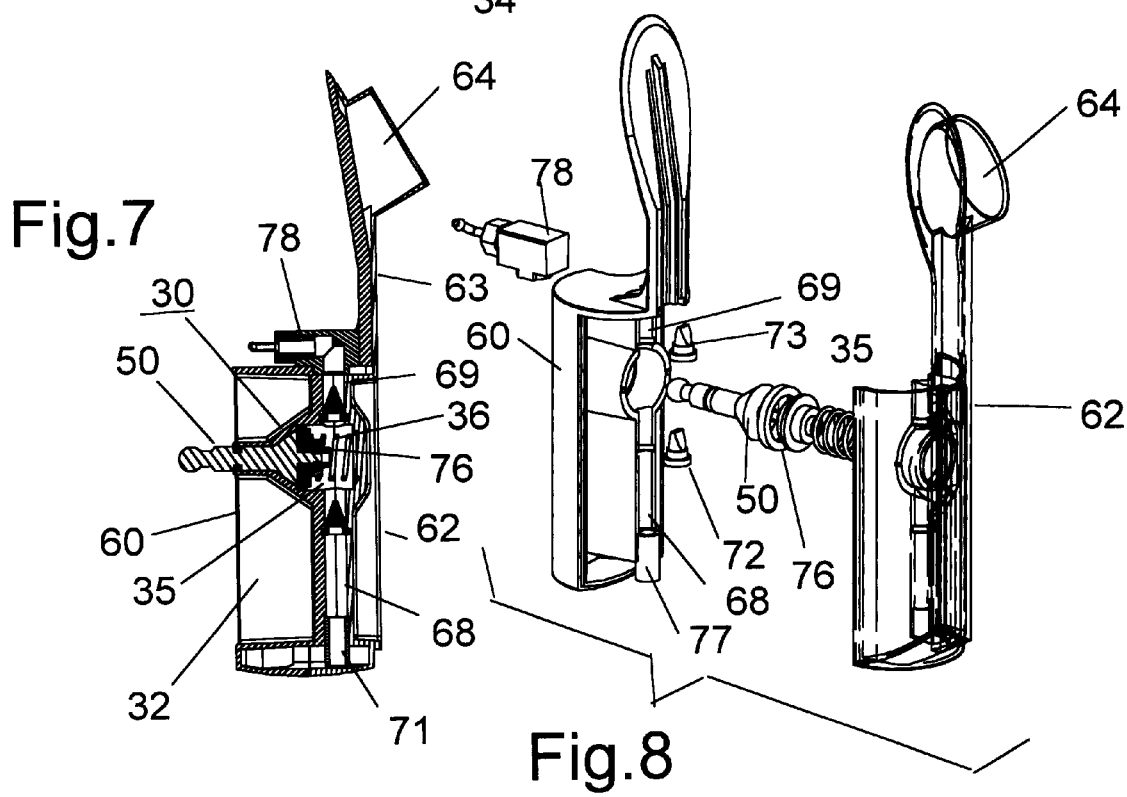

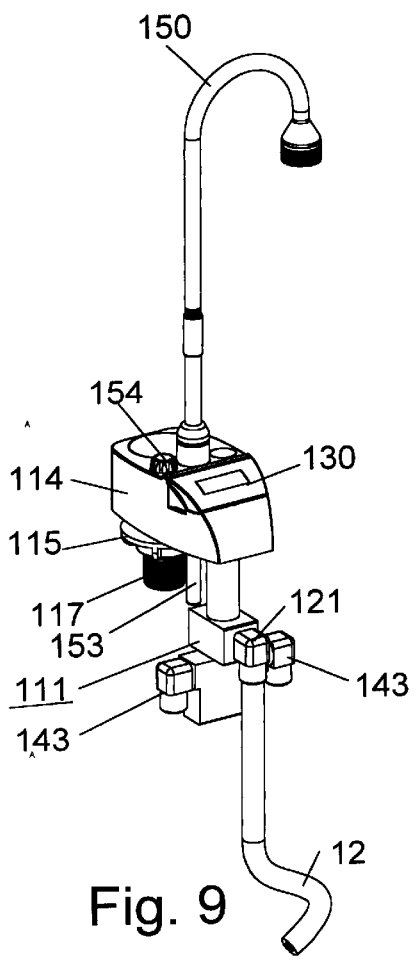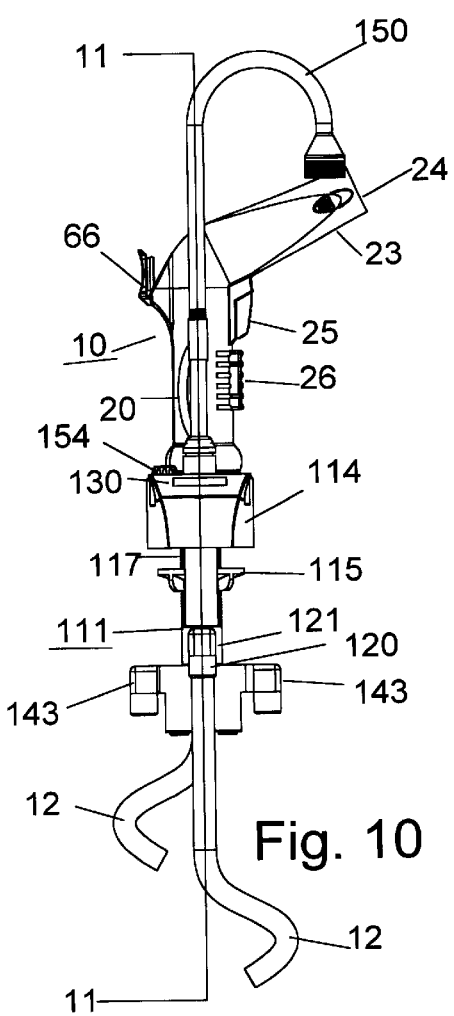

MANUAL DISHWASHING SPRAY HEAD WITH WATER AND SOAP CONTROLS

BACKGROUND OF THE INVENTION

Spray heads providing manually controlled spray from a nozzle at the end of a retractable hose mounted on a horizontal surface in the vicinity of a kitchen or marine galley sink have been popular for many years. However, most heads have no provision for selective dispensing of liquid soap or detergent with or in lieu of the water discharge. Moreover, it is desirable that in a spray head dispensing water and soap that the head be movable and operable using one hand so that the other hand can be used to hold a dish or other item to be sprayed. The configuration of a spray head should be readily graspable with one hand and have individual controls operable for water and soap without interfering with retention of the grasp of the hand.

SUMMARY OF THE INVENTION

The present invention provides for selectably controlling the dispensing of water and/or soap from a spray head connected to a retractable supply hose and having a pistol like handle grip with a plurality of individual trigger controlled actuators at the front of the grip to be operated by the user's finger-pulling actions toward the thumb of the user's hand. Preferably dispensing of water is controlled by means of one control which includes a water control valve enabling a continuously variable water flow dependent on the degree of depression of a valve actuator at the front of the handle grip. Control of soap dispensing is preferably achieved by means of a soap pump providing an ejection of a quantity of soap dependent on the displacement during one or more strokes of a soap pump actuator at the front of the handle grip. Comfort in holding and manipulating the spray device during use is improved by means providing a swivel connection between the retractable hose and the device handle to make angular and rotational positioning of the device less dependent on stiffness or flexibility of the hose.

The invention also provides a unitary assembly including a mounting base for the spray device and its retractable hose which incorporates, in addition to the water flow control in the spray device, a dedicated base structure with separate manually controlled temperature selection and flow control which can remain in a preselected condition with the spray device providing total regulation of the volume of water being used. Orientation of the spray device on the base may be such as to enable the spray device to be used without withdrawing it from the base in a kitchen or camping environment without need for additional temperature controlled water outlets. However, this unitary structure may also include a momentary cold water valve with a tall slender crooked spigot for filling a drinking glass.

The compact unitary assembly of this invention is particularly useful in space restricted recreational environments of camping and mobile land and marine vehicles. In such environment not only is space often limited but also available water is often limited. Water use can be limited by relying on the normally closed condition of the water control valve of the spray device for regulating principal water use.

Among the features of the present invention is a comfortable convenient arrangement of support for and operating controls for manipulating with one hand a water and soap dispensing retractable spray device.

Additional features of the invention related to its simplicity and low cost of manufacture will be apparent from the ensuing description details. Most of the components of the invention can be conveniently molded or machined at low cost because of their design.

It is an object of the present invention to provide a low cost, easily installed and space saving spray device.

It is also an object of the present invention to provide a low cost, easily installed and space saving spray device assembly with its own separated dedicated manually controlled temperature and flow regulation.

Another object is to achieve reduced effort required to manipulate a water spray device from both mere holding of the device as well as operating the controls thereof.

Another object of the invention is to provide for orientation or indexing of the rotated position of an accessory brush attachment to assure alignment of latching and non-rotating cooperating mechanisms on the nozzle and on the brush accessory to facilitate brush attachment and avoid damage to the mechanisms.

Another object of the invention is to prevent rotation of an accessory brush which is releasably latched to the spray nozzle.

Among the objects of the invention is to provide an elongated spray device nozzle portion in combination with a brush accessory enabling scouring of a deep or tall tumbler or quart size mason jar.

Another object of the invention is to provide a bulbous-tipped accessory brush with omni-directional bristles at its distal end to facilitate cleaning the lower inner corners of a tumbler or jar.

A further object of the invention is to enable mounting of a spray device for dispensing water and/or soap from the distal end of a hose in a bathroom shower stall.

Another object of the invention is to provide at a bathroom shower head a diverting valve connection for a water/soap spray scrubbing device with a hose of sufficient length for human or pet bathing as well as for scouring the extremities of a shower stall or bathtub area.

Another object of the invention is to provide a spray head with an accessory brush with soft flexible knobby bristle-like projections to bathe, massage and groom pets.

Another object of the invention is to provide the discharge end of a manually controlled spray head with a releasably latched accessory scrubbing or scouring device having a flexible abrasive surface which may be under control of a user be manually selectively saturated with soap and/or water by the spray head.

DESCRIPTION OF THE DRAWINGS

FIG. 1 is a perspective view of an uninstalled spray head assembly as seen from the left side above and behind the spray head.

FIG. 2 is a perspective view of an uninstalled spray head assembly as seen from the right side below and to the front of the spray head.

FIG. 3 is a left side view of the uninstalled spray head assembly with an accessory brush attached.

FIG. 4 is a section on line 4—4 of FIG. 3.

FIG. 4A is an enlarged section of the circled brush attachment area of FIG. 4.

FIG. 5 is a view similar to FIG. 3 but showing internal water valve and soap pump components in section along the center plane of the spray head and showing the spray hose extending vertically through counter mounting hardware as in an installed orientation.

FIG. 5A is an enlarged view of the circled area of FIG. 5.

FIG. 6 is an exploded perspective view of the water spray valve subassembly removed from the spray head assembly.

FIG. 7 is a section of the soap reservoir and soap pump assembly removed from the spray head assembly.

FIG. 8 is an exploded perspective view of the soap pump and reservoir subassembly of FIG. 7.

FIGS. 9–13 show an alternative spray head assembly and mounting base arrangement for the spray head of FIGS. 1–4.

FIG. 9 is a perspective view of a temperature control and mounting base assembly for the spray head and hose with a supplemental elevated glass filling outlet.

FIG. 10 is a view showing a spray head seated in the mounting base assembly.

FIG. 11 is a section on line 11—11 of FIG. 10.

FIG. 12 is a section on line 12—12 of FIG. 11 showing details of the valve for the glass filling outlet.

FIG. 13 is a section on line 13—13 of FIG. 11 showing hot/cold water mixing valve details.

DETAILED DESCRIPTION OF THE INVENTION

Figures 11, 12, 13:
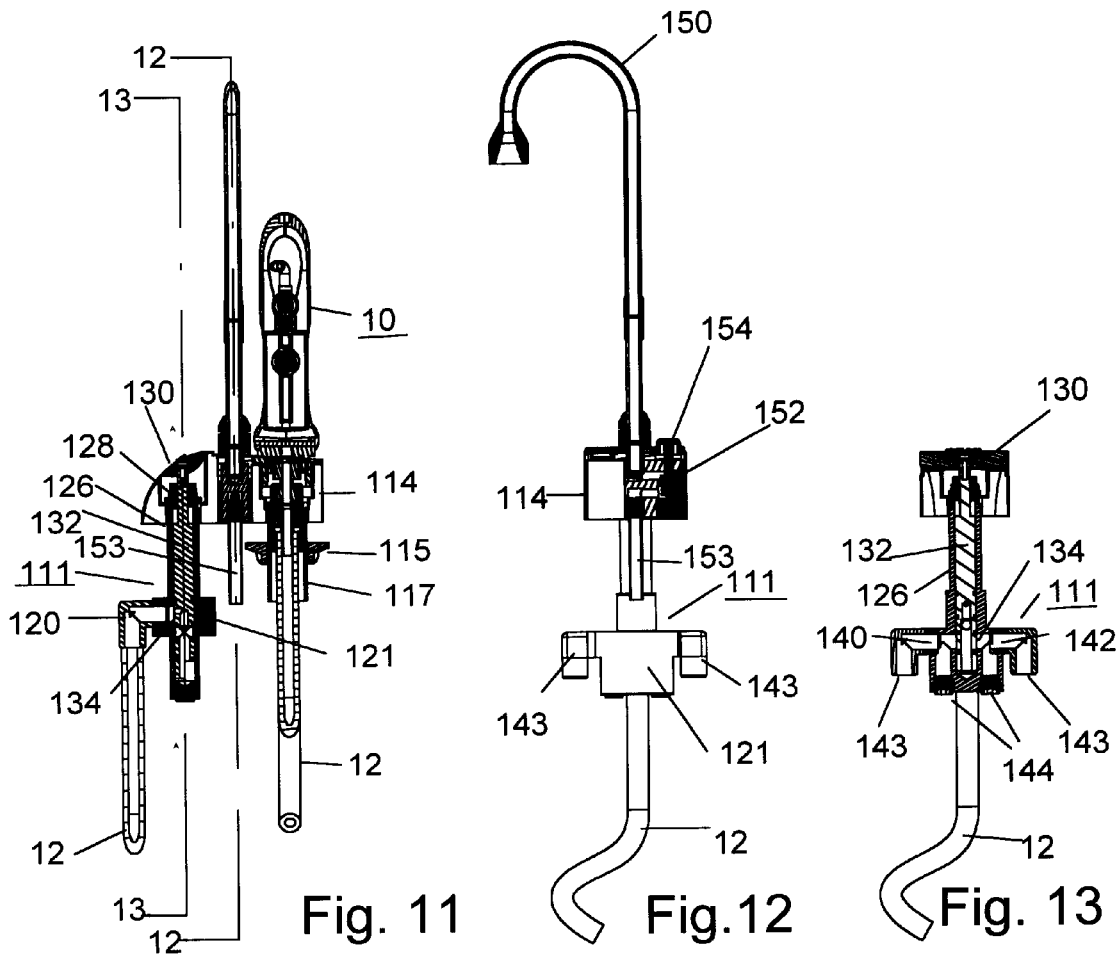

FIGS. 1–5 illustrate a preferred embodiment of the invention incorporating a spray head assembly including a pistol grip spray head 10 swivelably attached to a retractable spray liquid supply hose 12 and a base unit 14 adapted with a clamping nut 15 and threaded mounting sleeve 17 for mounting in a hole in a horizontal kitchen counter or sink platform. The hose 12 extends through the sleeve to a suitable source of spray liquid such as water to be released from the spray head. The outer surface of the spray head is principally formed by two mirror image molded shells 18 and 19 joined or secured together by adhesive or other suitable means along a central plane of symmetry.

The spray head has a handle 20 connected to the hose by means of an axially-hollow ball-headed connector 22 screwed into the base 21 of the handle with its ball head swivelably sealed in a fitting on the end of the hose 12. The handle base 21 has an hexagonal multi-sided shape to fit within a mating hexagonal opening on the base unit 14 to keep the head 10 erect in any of several selectable positions when the hose is fully retracted through the base unit 14. The spray head has a dispensing head nozzle portion 23 extending forwardly from the handle 20 with central axes of the handle 20 and the dispensing head portion 23 intersecting in a common central plane of symmetry at an obtuse angle of about 120 degrees. The distal end 24 of the nozzle 23 is provided with ports for discharging spray liquid and soap.

The spray head handle 20 is readily grasped by either hand of the user with the thumb and fingers encircling the handle in opposite directions. At the front of the handle 20 are two finger-operable triggers 25 and 26, the pivoted trigger 25 providing means for variably controlling a valve 28 to regulate discharge of spray liquid from the spray head 10. The trigger 26 slidably reciprocates in the handle to provide means for variably actuating and controlling a pump 30 to discharge soap from a soap reservoir 32 to exit the spray head 10. The triggers 25 and 26 may be selectively operated to dispense from the nozzle 23 a desired mix of spray liquid and soap or either trigger may be operated independently to select only a respective spray liquid or soap. The valve 28 has an operating valve chamber 29 with lateral side walls portions 33 and 34 as seen in FIG. 6. The pump 30 has an operating pump chamber 3 with fore and aft coaxial chamber portions 35 and 36 as seen in FIG. 7.

The two mirror-image shell portions 18 and 19 forming the body of the spray head 10 are symmetrical with respect to a center plane defined by the intersecting longitudinal axes of the handle 20 and the nozzle 23. These shell portions 18 and 19 enclose within the handle 20 an elongated chamber 44 within which are mounted the spray liquid control valve 28 and the soap pump 30 and soap reservoir 32. The inside walls of the shells 18 and 19 have appropriate supporting seats at spaced points along the outer cylindrical housing surfaces of the valve 28 and the reservoir 32 for firmly securing these housing surfaces. The soap reservoir is made of a transparent plastic enabling soap level to be visually checked. At the rear of the handle 20 the two shell portions 18 and 19 are separated at 27 along the rear transparent wall of the soap reservoir to provide visibility along the length of the reservoir of the quantity of soap in the reservoir 32 in chamber 44. Elongated side openings 45 at opposite sides of the handle provide similar means for alternative additional places for checking soap level.

Both the valve 28 and the pump 30 have linearly reciprocating spring biased actuators and operating elements which are solids of revolution with parallel axes essentially intersecting and perpendicular to the longitudinal center or axis of the handle and in the common plane of symmetry defined by the intersecting axes of the handle 20 and the nozzle 23. These respective actuators and operating elements 48 and 50 have ball-like ends which snap into cups 49 and 51 on the rear inside faces of the respective triggers 25 and 26.

FIG. 6 shows an exploded or preassembled arrangement of the components of the spray liquid valve 28. The cylindrical housing of this valve which forms the valve operating chamber 29 comprises two molded mirror-image shell members 33 and 34 which, when assembled, are joined or secured together at the common plane of symmetry by a suitable adhesive. The trigger 25 and the valve actuator 48 are biased by coil spring 53 to a closed valve position in which a conical valve member 54 engages a conical valve seat 55. The valve is provided with appropriate annular sealing members around the valve member 54. Connector members 56 and 58 are sealed in apertures in the top of the valve housing for connection to respective spray liquid inlet conduit 57 and outlet conduit 59.

FIG. 8 shows an exploded or preassembled arrangement of the components of the soap pump 30 and soap reservoir 32 of FIG. 7. Two complimentary molded front and rear shell components 60 and 62, when assembled and adhesively secured at their complimentary edges on opposite sides of the central plane of symmetry of the spray device 10, define the soap reservoir chamber 32 and a duck-billed soap filling passage structure 63 extending upwardly from the reservoir 32 within the handle 20. Near the top rear of the handle 20 the rear shell member 62 has an annular fill opening forming a reservoir filling neck 64 which is closed by a molded snap plug 66 pivotally supported on the handle 20 of the spray head 10.

Referring to FIGS. 5A, 7 and 8, the front and rear shell components 60 and 62 have longitudinal peripheral or side edges bonded together at a plane containing the axis of handle 20 and orthogonal to the symmetry plane of the intersecting handle/nozzle axes, this bond being on opposite sides of the symmetry plane. The components 60 and 62 are symmetrical with respect to the symmetry plane of the spray device 10. Within the reservoir 32 the shells 60 and 62 have further complementary integrally molded coaxial portions 35 and 36 forming fore and aft portions of the structure of the chamber 31 of soap pump 30 as well as other molded portions forming inlet and outlet coaxial passage means 68 and 69 to and from the pump chamber 31. These further complementary portions are bonded or joined along their edges on opposite sides of the symmetry plane of device 10. The axis of passages 68–69 is parallel to the handle axis and rearwardly offset with respect to this axis in the central plane of symmetry of the spray head 10. A coaxial plastic sleeve 71 is bonded in the lower entrance end of inlet passage and projects into closely spaced relationship to the bottom end of the soap reservoir 32 remote from the dispensing head 23 to allow stored soap to be essentially completely pumped from the reservoir. Only one-way upward flow through the passages 68 and 69 is assured by flexible rubber one-way duckbill check valves 72 and 73 having annular entrance ends secured in an annular grooves in the walls of respective inlet passage 68 and outlet passage 69. Another like duckbill valve may be similarly secured in a connector between the spray liquid valve 28 and its outlet conduit 59 to prevent reverse flow into the valve 28.

In FIG. 5A, annular piston member 76 secured to the inner end of pump actuator 50 and having a sealing O-ring in a peripheral groove is slidable within the cylindrical wall of the pump chamber 31. The piston member 76, pump actuator 50 and pump trigger 26 are outwardly or forwardly biased by a coil compression spring 77 to the positions in FIG. 5A. Repeated partial or complete depression of the trigger 26 controls the pumping of soap from passage 69 through an outlet fitting 78 which connects the pump to conduit 79 leading to a soap outlet means including a nozzle element 80 at the distal end of the nozzle portion 23 of the spray head 10.

FIG. 5A shows the ball head of connector swivelably mounted for angular and rotational movement between a pair of O rings within an annular cap member 82 threaded on a connecting member sealed on the end of the spray liquid supply hose 12.

As seen in FIGS. 3, 4 and 4A, an annular cup-shaped brush accessory 85 is releasably latched to the distal end of the nozzle portion 23 of the spray head 10 to facilitate scrubbing, cleaning and rinsing of dishware. Different shapes and diameters of accessory brushes (not shown) may be similarly latched to the spray head 10 to suit a variety of shapes of dishware or other objects to be scrubbed and sprayed. The brush 85 has a cup-shaped member 86 surrounding the end of the nozzle portion 23 and carrying a plurality of bristle tufts 87 extending omnidirectionally from the outer surface of cup-shaped member 86.

As seen in FIGS. 4 and 4A the distal end of the nozzle structure portion 23 includes inside the ends of the shell portions 18 and 19 an annular support member 90 spaced from the shell portions 18 and 19 to form therewith an unobstructed annular recess space 92 of sufficient length to receive and support with a sliding fit an annular attachment sleeve 93 extending axially from the inside bottom of the cup-shaped member 86. The peripheral end of the sleeve 93 within the recess 92 has latching means such as outer projections or an annular latching ring 95 by means of which the brush accessory 85 is held securely and releasably latched to the pistol grip spray head 10. Each of the shell portions 18 and 19 is molded with latching and unlatching means comprising an oval latch release lever element 97 centrally pivoted at each side of the lever (FIGS. 1 and 4A). Each element 97 has a front pivoted latching end portion and a rear externally accessible manually depressible actuating end portion for unlatching. The lever elements are biased to the positions of FIG. 4A by inherent resiliency of the plastic material of shell portions 18 and 19 which support the elements 97 only at the side pivot points by means of small bridges resiliently connecting the oval elements 97 with main forward portions of the external nozzle shells 18 and 19. The front latching end portions of elements 97 extend into the recess 92 and are cammed outwardly by the latching projections or ring 95 as the brush accessory 85 is attached. The latching portions automatically snap behind the projections or ring 95 to secure the brush accessory 85. Release of the brush accessory is achieved by simultaneously manually squeezing together the actuating rear end portions of the latching levers 97 and pulling the brush accessory 85 off of the spray head 10.

The inner end of the annular support member 90 has an outer shoulder 100 bonded to insides of the shell portions 18 and 19. The outer end of member 90 carries a spray liquid and soap dispensing structure comprising a spray liquid plenum 102 feeding a ring of spray openings 103 at the end of the spray head fed from the spray liquid conduit 59. Within the ring of spray openings 103 the dispensing structure includes the soap dispensing nozzle element 80 fed from the soap pump outlet conduit 79.

Figure 22:
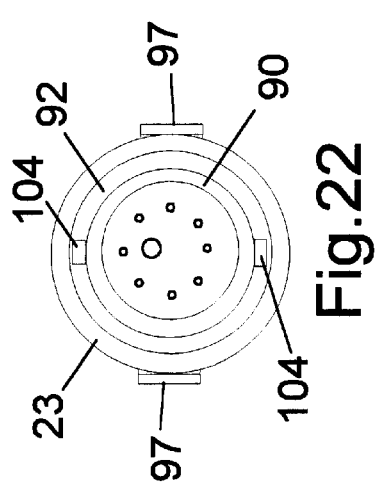
FIG. 22 is a view of the discharge end of the nozzle of the spray head of FIGS. 5–5A.

The brush accessory of FIGS. 3–4A may have a pair of diametrically opposed longitudinal slots in a plane perpendicular to the plane of the section of FIG. 4A cooperating with a pair of longitudinal ribs 104 at diametrically opposite sides on the support member 90, as seen in FIG. 22, to make the latched brush 85 non-rotatable in the end of the nozzle portion 23. Such longitudinal slots are shown at 179 in the accessory brush of FIGS. 15–17.

Referring to FIGS. 10–12, the spray head 10 is like that of FIG. 1, but it is mounted in a base structure 114 which includes an adjustable-temperature valve assembly 111 to be mounted below a countertop (not shown) by means of a clamping nut 115 on a threaded mounting sleeve 117 which extends through the countertop and accommodates the retractable flexible hose 12 to be connected to a hose connection outlet 120 on a valve body 121 of the valve assembly 111. The valve body 121 is suspended beneath the upper exposed valve housing portion 124 of the valve assembly by means of a shouldered valve body extension 126 accommodated in a hole in the countertop and secured in the valve housing portion 124 with a nut 128 concealed in a recess in the housing portion 124 beneath a valve operating handle 130 secured by a concealed screw to an extension stem 132 of the main operating valve member 134 which axially slides and rotates in the valve body 121 to provide actuator means for selectably controlling water volume and temperature in a conventional manner by lifting and turning the handle 130. The handle 130 and stem 132 are keyed by mating flat or splined surfaces to fix their relative positions during temperature selection. In the "off" position of the valve handle 130 its lower horizontally extending cylindrically curved surface mates with a similar but shorter complementary horizontally extending curved surface on the valve housing portion 124. Opposite ends of the handle 130 extend beyond this complementary surface to provide a convenient means for lifting and turning the handle. In the valve body 121 is a hot water input plenum 140 and a cold water inlet plenum 142. For each plenum there are two external openings for selective connection of a fitting 143 for the respective water line and a plug 144 for convenience of making plumbing connections.

As seen in FIGS. 9–12 a tall slender crook shaped swiveling spigot tube 150 for filling a drinking glass is sealed in the top of the base structure member 114 and is provided with a normally closed and momentarily open valve means 152 within the member 114 member. The valve 152 is spring biased with operating elements similar to those of valve 28. The cold water plenum 142 of the mixing valve 111 is connected by suitable means to the depending stem 153 to supply the valve 152 and the spigot tube with the cold liquid from the mixing valve. A manually operable push button 154 on the top of the member 114 is spring biased upwardly to the closed valve position and may be manually depressed to momentarily open the valve means 152 for adding cold water to a drinking glass as long as the push button 154 is depressed. The enlarged dispensing head 155 on the spigot tube 150 is internally threaded to provide means for attachment of conventional aeration or filter devices.

If it is desired to mount the spray head 10 in spaced relationship relative the apparatus of FIG. 9, this can be done with separate hardware as shown in FIG. 3. In this case a plug 156 is inserted into the spray head receiving opening in the base structure member 114. The tube 150 is screwed into a female fitting (not shown) in the member 114. Tube 150 can be removed and a sealing plug can be inserted into the female fitting.

Figure 14:
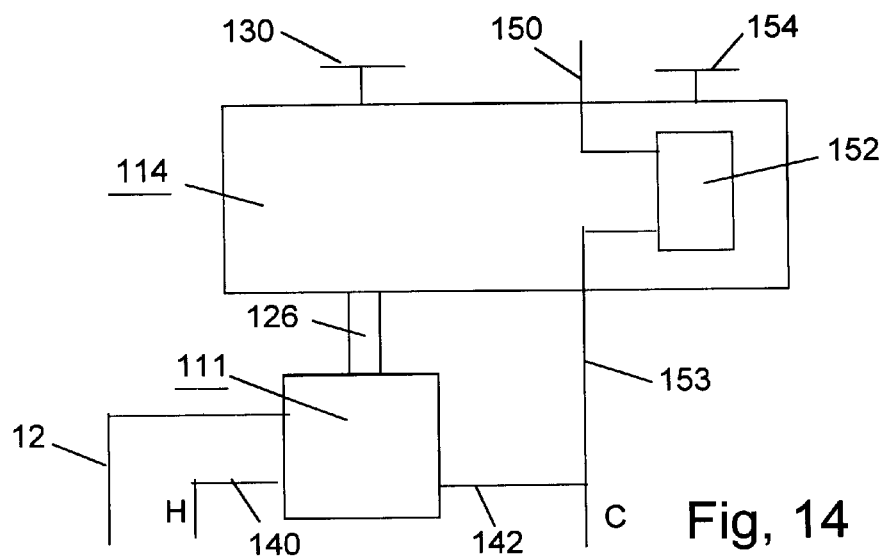
FIG. 14 schematically illustrates the hot and cold liquid supply flow paths for the apparatus of FIGS. 9–13.

FIG. 14 is a schematic representation of the flow paths from hot (H) and cold (C) water supply sources to hose 12 through mixing valve 111 under control of the valve actuator 130 and to the glass filling spigot 150 under control of the momentary valve 152 and its actuator 154.

To prepare the spray head for spray use under control of trigger 25, the valve handle 130 is lifted to a first flow rate selecting position and rotated to a temperature selecting position to select a desired mix of hot and cold spray liquid to be supplied to the spray head through the spray hose 12.

Figure 15:
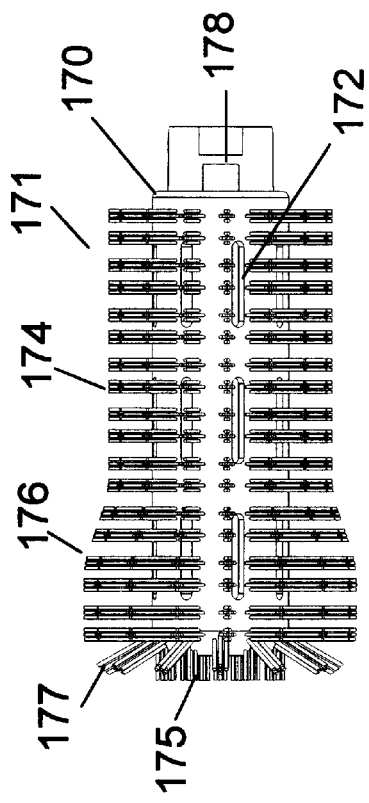
FIG. 15 is a side view of an elongated accessory brush.
Figure 17:
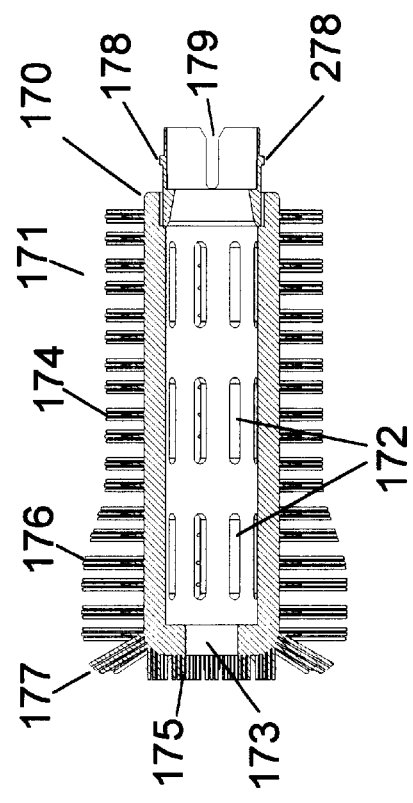
FIG. 17 is a longitudinal section of the brush of FIGS. 15–16 on line 17—17 of FIG. 16.
Figure 16:
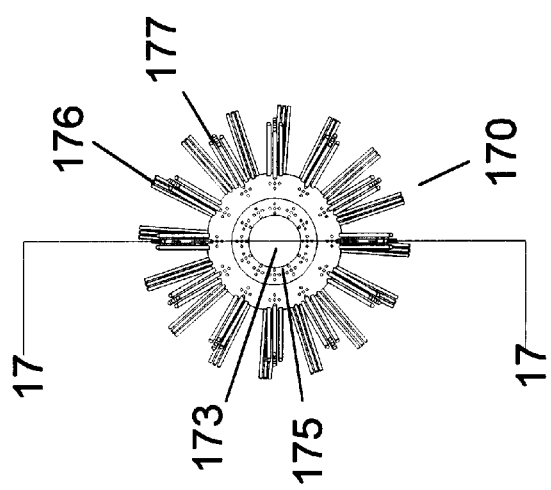
FIG. 16 is an outer end view of the brush of FIG. 15.

FIGS. 15–17 illustrate en elongated spray brush accessory 170 which can be latched to the outer end of the spray head 10 to facilitate scrubbing or scouring of deep objects such as a tall glass tumbler or the interior of a well known quart size mason jar. Such objects are typically about 6½ inches deep. The brush 170 has an elongated cylindrical bristle supporting portion 171 with a plurality of elongated slots 172 along the brush length and end opening 173 allowing discharged liquid or soap from the spray head 10 to saturate all of the brush bristles. Between several annular rows of radially extending bristles 174 along the slots 172 and concentric rings of axially extending end bristles 175 are annular rings of longer bristles 176 and angularly oriented bristles 177 which form a bulbous mass of essentially omni-directionally oriented bristles to facilitate scrubbing inner corners and undercut shoulders of the deep objects. The cylindrical latching end of brush 170 has opposite latching projections 178 corresponding to the projections 95 of FIG. 4A and a longitudinally extending diametrically opposite pair of slots 179 orthogonally located relative to the latching projections 178, as seen in FIG. 22, providing means for orienting the brush on outer longitudinally extending ribs or projections 104 on the annular supporting member 90 in the annular space 92 to keep the latched brush from rotating relative to the spray head 10 during scouring or scrubbing use.

If necessary because of the diameter of the discharge end of the nozzle portion 23, the portion of the bristle supporting brush portion 171 extending beyond this discharge end may be of reduced diameter and of sufficient length to enable the bristles thereon to enter the small diameter open end of a common 8 oz. baby bottle and clean its entire length. Such a bottle has a round opening about 1-¼ inches in diameter and an internal length of about 6 inches.

Figure 18:
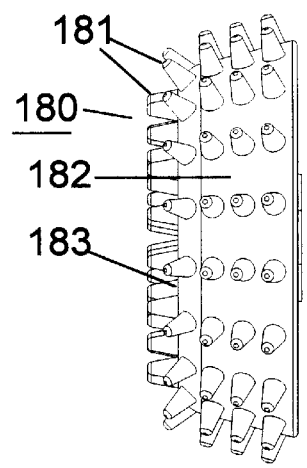
FIG. 18 is a side view of a pet brush accessory.
Figure 19:
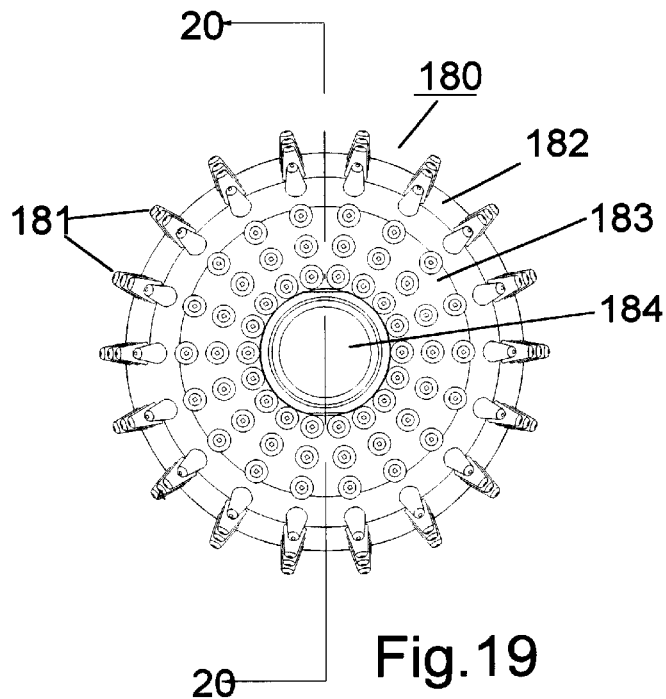
FIG. 19 is an outer end view of the brush of FIG. 18.
Figure 20:
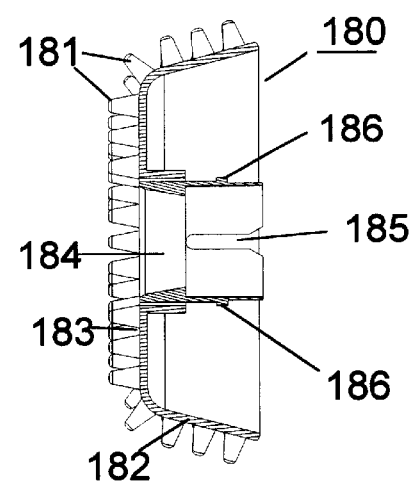
FIG. 20 is a longitudinal section of the brush of FIGS. 18–19 on line 20—20 of FIG. 19.

FIGS. 18–20 illustrate a pet spray brush accessory 180 which can be latched to the outer end of the spray head 10 to facilitate bathing, massaging and grooming a pet. The brush has a plurality of short stubby finger-like resilient knobby projections 181 as are commonly found on pet bathing implements. Such projections facilitate removing pet hair from between the projections. The resilient projections 181 of brush 180 are supported by a short generally conical supporting surface portion 182 and an end supporting surface 183 extending around a water and/or soap discharge opening 183. The cylindrical latching end of brush 180 has diametrically opposite latching projections 186 corresponding to the projections 95 of FIG. 4A and a longitudinally extending diametrically opposite pair of slots 185 orthogonally located relative to the latching projections 186 for orienting the brush on outer longitudinally extending ribs or projections 104 on the annular supporting member 90 to keep the latched brush accessory 180 from rotating relative to the spray head 10 during use.

Figure 21:
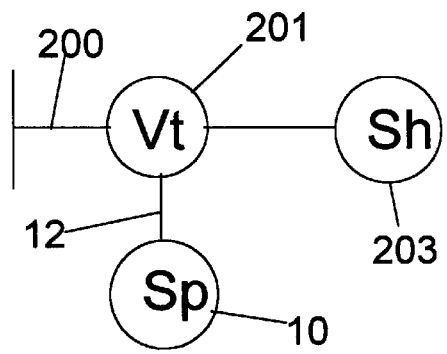
FIG. 21 schematically illustrates the connection of the spray head invention in a shower bath with a selectably operable diverter valve connected ahead of a conventional shower head.

FIG. 21 schematically shows selectable alternative flow paths of conventionally temperature controlled water from a wall outlet 200 to a diverting T-valve 201 which provides means for selecting water flow to either a conventional shower head (Sh) 203 or to a spray head (Sp) 10 via a flexible hose 12. The valve 201 may a valve which can be manually operated to select the desired path, or it may be an automatic valve which is operated by means known and commercially available in the art which interrupts the flow path to the shower head 203 when the hose 12 is connected to the valve 201 and restores the flow path to the shower head when the hose 12 is disconnected from the valve 201. The length of the hose 12 may be selected to reach any point in a shower or bath installation to enable use of the spray head 10 for cleaning bath or shower walls and facilities. For long lengths the hose may be a resiliently coiled hose for self retraction.

Although the illustrated embodiments refer to the accessory brushes as having bristles or finger-like projections, the invention contemplates that similarly shaped brush configurations can be used having suitable similar shapes with porous flexible abrasive tough surfaces made of material commonly used for kitchen scouring purposes but attached, adhered or otherwise secured to connecting means to be releasably latched in the end of the spray head in a manner described in detail in the specification.

Other variations within the scope of this invention will be apparent from the described embodiments and it is intended that the present descriptions be illustrative of the inventive features encompassed by the appended claims.

What is claimed is:

1. A spray nozzle assembly to be hand held and attached to the end of a flexible pressurized liquid supply hose, said nozzle assembly including an elongated dispensing head with a nozzle structure means for discharging liquid longitudinally from the front end of said dispensing head, an elongated handle encircled by a user's thumb and fingers during use, said handle having one end connected to the back end of the dispensing head, means for connecting the other end of the handle to said liquid supply hose, flow control means in said nozzle assembly for transferring a pressurized rinsing liquid from the pressurized liquid supply hose through said handle and through said dispensing head for discharge from the front end of said dispensing head, a liquid soap reservoir in said handle including means for the user to fill the reservoir with soap liquid, and a soap pump in said handle for pumping soap liquid from said soap reservoir, outlet means extending through said dispensing head for discharging pumped soap liquid from the front end of said dispensing head independently of discharge of said rinsing liquid, said flow control means including a valve unit in the handle with a trigger actuator at the front side of the handle for actuation by one finger of a hand grasping said handle, said soap pump having a trigger actuator at the front side of the handle for actuation by another finger of the same hand while maintaining a grasp on the handle;

said dispensing head having at its distal end a generally cylindrical shell portion, said nozzle structure being supported within said shell portion and connected to said shell portion rearwardly of the forward end of the shell portion by means forming a generally unobstructed cylindrical space to accommodate and hold a cylindrical supporting portion of an accessory to be attached to the dispensing head, further including manually engageable latching means at said cylindrical space to secure an accessory to the dispensing head, said latching means includes resilient displaceable elements molded integrally with circumferentially spaced parts of said cylindrical shell portion and having latching portions displaceably projecting into said cylindrical space, said displaceable elements include unlatching means comprising manually depressible lever portions accessible at the outside of said shell portion for manually unlatching a cylindrical accessory support latched in said space.

2. A spray nozzle assembly to be hand held and attached to the end of a flexible pressurized liquid supply hose, said nozzle assembly including an elongated dispensing head having a central axis and including a nozzle structure means for selectively discharging at least one liquid longitudinally from the front end of said dispensing head, an elongated handle encircled by a user's thumb and fingers during use, said handle having a central axis and having one handle end connected to the back end of the dispensing head with said axes intersecting at an obtuse angle, means for connecting the other end of the handle to said liquid supply hose, flow control means in said nozzle assembly for transferring a pressurized rinsing liquid from the pressurized liquid supply hose through said handle and through said dispensing head for discharge from the front end of said dispensing head, a liquid soap reservoir in said handle including means for the user to fill the reservoir with soap liquid, and a soap pump in said handle for pumping soap liquid from said soap reservoir, outlet means extending through said dispensing head for discharging pumped soap liquid from the front end of said dispensing head independently of discharge of said rinsing liquid, said flow control means including a valve unit in the handle with a trigger actuator at the front side of the handle for actuation by one finger of a hand grasping said handle, said soap pump having a trigger actuator at the front side of the handle for actuation by another finger of the same hand grasping the handle, said valve unit having a stationary valve chamber formed by two molded members with their peripheries joined at a common plane containing said intersecting axes and a trigger operated valve element movable in said chamber in a direction in said plane and perpendicular to the handle axis.

3. A spray nozzle assembly to be hand held and attached to the end of a flexible pressurized liquid supply hose, said nozzle assembly including an elongated dispensing head having a central axis and including a nozzle structure means for selectively discharging at least one liquid longitudinally from the front end of said dispensing head, an elongated handle encircled by a user's thumb and fingers during use, said handle having a central axis and having one handle end connected to the back end of the dispensing head with said axes intersecting at an obtuse angle, means for connecting the other end of the handle to said liquid supply hose, flow control means in said nozzle assembly for transferring a pressurized rinsing liquid from the pressurized liquid supply hose through said handle and through said dispensing head for discharge from the front end of said dispensing head, a liquid soap reservoir in said handle including means for the user to fill the reservoir with soap liquid, and a soap pump in said handle for pumping soap liquid from said soap reservoir, outlet means extending through said dispensing head for discharging pumped soap liquid from the front end of said dispensing head independently of discharge of said rinsing liquid, said flow control means including a valve unit in the handle with a trigger actuator at the front side of the handle for actuation by one finger of a hand grasping said handle, said soap pump having a trigger actuator at the front side of the handle for actuation by another finger of the same hand grasping the handle;

said soap reservoir having a stationary reservoir chamber formed by two molded members with their peripheries joined on opposite sides of said common plane containing said intersecting axes;

said soap reservoir chamber encloses a soap pump chamber formed by portions of said two molded members with their peripheries joined within the soap reservoir on opposite sides of said common plane containing said intersecting axes, said soap pump including a trigger operated pump element movable in said pump chamber in a direction in said plane and perpendicular to the handle axis, said soap pump having a pump inlet at the end of the reservoir chamber remote from the dispensing head.

4. A spray nozzle assembly including a hand held spray device to be hand held and attached to one end of a flexible pressurized liquid supply hose, said spray device including an elongated dispensing head for selectively discharging at least one liquid longitudinally from the front end of said dispensing head, an elongated handle having one end connected to the back end of the dispensing head, means for connecting the other end of the handle to said liquid supply hose, flow control means in said spray device for transferring a pressurized rinsing liquid from the pressurized liquid supply hose through said handle and through said dispensing head for discharge from the front end of said dispensing head, a liquid soap reservoir in said handle including means for the user to fill the reservoir with soap liquid, and a soap pump in said handle for pumping soap liquid from said soap reservoir and including pump outlet means extending through said dispensing head for discharging soap liquid from the front end of said dispensing head independently of discharge of said rinsing liquid, said flow control means including a valve unit with a trigger actuator at the front side of the handle for actuation by one finger of a hand grasping said handle, said soap pump having a trigger actuator at the front side of the handle for actuation by another finger of the same hand grasping the handle, a mounting base structure for said spray device and having a member with passage means for accommodating withdrawal and storage movements of said liquid supply hose, means for securing said member to a horizontal supporting surface with said passage means in registry with an opening in said supporting surface whereby the storage position of the hose is beneath said supporting surface, said mounting base structure including a mixing valve having a valve body portion with hot and cold liquid inlet connectors, said mixing valve having hot and cold liquid mixing means including a manually accessible mixing temperature actuator to control said mixing means, and volume flow control means under control of said mixing temperature actuator for regulating amount of flow from said mixing means to an outlet means connected to the other end of said liquid supply hose.

5. A spray nozzle assemble according to claim 4 wherein said mixing valve includes a tubular means supporting said valve body in spaced relationship to said member to enable the valve body to be supported below said horizontal supporting surface, said manually accessible mixing temperature actuator including an actuator part extending through said tubular means, and a mixing temperature selecting knob accessible above said mounting base member and connected to said actuator part for manually controlling output liquid temperature and amount of flow from said valve to the spray head.

6. A spray nozzle assembly according to claim 5 wherein said valve actuator is an element coaxial with said tubular means and includes means for slidably and rotatably sealing the element in said tubular means for respectively controlling flow and temperature of mixed liquid from the mixing valve outlet means.

7. A spray nozzle assembly claim 5 wherein said knob is movable rotatably and axially with respect to said tubular means for controlling flow and temperature of mixed liquid from the mixing valve outlet means.

8. A spray nozzle assembly according to claim 4 wherein said hose is the only outlet of mixed liquid connected to said outlet means.

9. A spray nozzle assembly according to claim 4 wherein a tall slender crook shaped tube for filling a drinking glass is sealed in the top of said member and is provided with a normally closed and momentarily open valve means within said member connecting said tube with the cold liquid connection to the mixing valve, and a manually operable push button on the top of said member to momentarily open said valve means as long as the push button is depressed.

10. A spray nozzle assembly according to claim 1 wherein said accessory has a flexible porous abrasive surface.

* * * * *